(No Model.)
P. S. WISEMAN.
SINGLETREE ATTACHMENT.
No. 403,816. Patented May 21 1889.
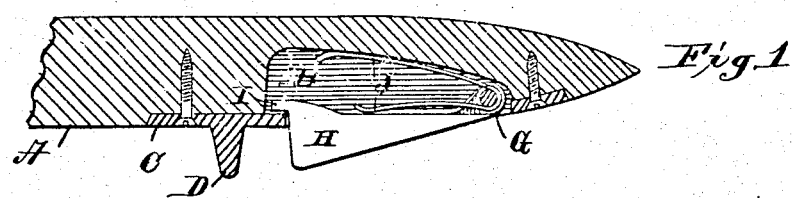
Fig. 1
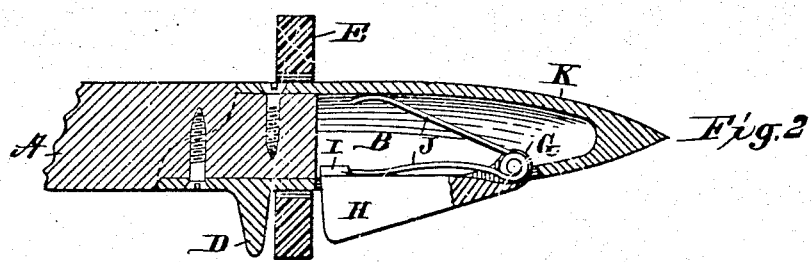
Fig. 2
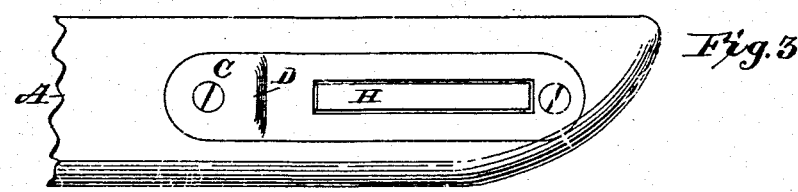
Fig. 3
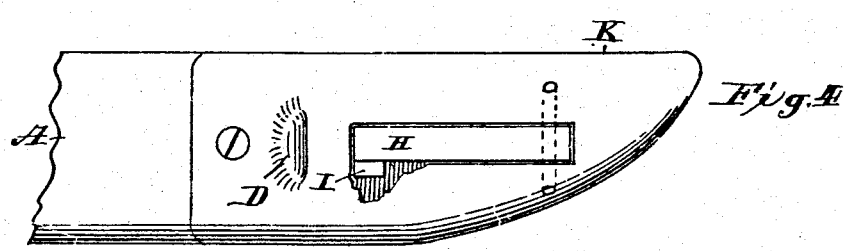
Fig. 4
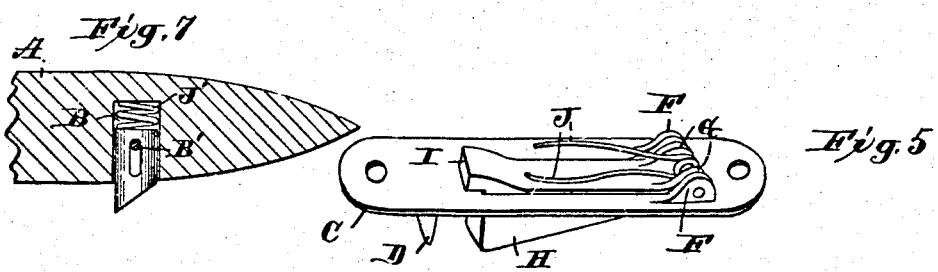
Fig. 7
Fig. 5
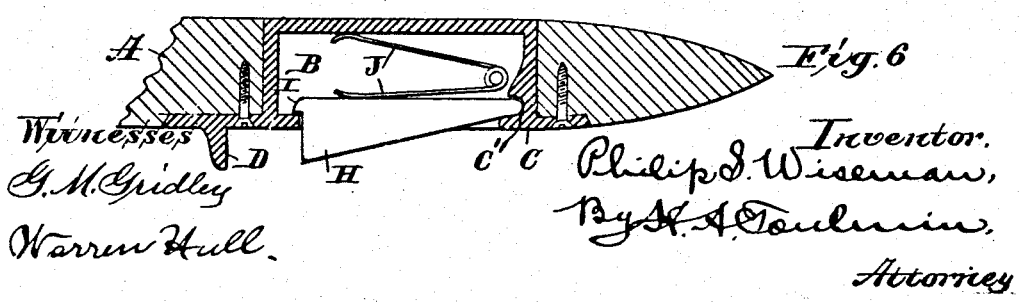
Fig. 6
Witnesses
G. M. Gridley
Warren Hull
Inventor
Philip S. Wiseman,
By H. A. Toulmin,
Attorney

UNITED STATES PATENT OFFICE.

PHILIP S. WISEMAN, OF SPRINGFIELD, OHIO, ASSIGNOR OF ONE-HALF TO ROSS MITCHELL, OF SAME PLACE.

SINGLETREE ATTACHMENT.

SPECIFICATION forming part of Letters Patent No. 403,816, dated May 21, 1889.

Application filed February 16, 1889. Serial No. 300,130. (No model.)

*To all whom it may concern:*

Be it known that I, PHILIP S. WISEMAN, a citizen of the United States, residing at Springfield, in the county of Clark and State of Ohio, have invented certain new and useful Improvements in Singletree Attachments, of which the following is a specification, reference being had therein to the accompanying drawings.

This invention relates to certain new and useful improvements in singletree attachments, designed for the purpose of readily admitting of placing the traces on the singletree, for holding the traces on them without liability of accidentally slipping off, and for admitting of their easy removal; and it consists, essentially, of the singletree recessed on the under side near the outer end, and a gravitating pawl arranged to recede into said recess when the trace is being placed on the singletree and to oppose the trace and prevent its slipping off, and of a shoulder on the singletree between which and the dog the trace is placed.

In the accompanying drawings, forming a part of this specification, and on which like reference-letters indicate corresponding parts, Figure 1 represents a longitudinal sectional view of the singletree with my improvements applied thereto; Fig. 2, a similar view of a modified form; Fig. 3, an inverted plan view of Fig. 1; Fig. 4, an inverted plan view of Fig. 2; Fig. 5, a detail perspective view of the gravitating pawl, its attaching-frame, and the anti-rattling spring; and Figs. 6 and 7, modified forms of gravitating pawls or dogs and the manner of mounting them.

The letter A designates one end of a singletree of any approved and known type, and the letter B a recess formed on the under side near the end thereof.

The letter C designates a metallic frame fitted into the singletree so as to be flush therewith, and secured by screws or other fastening devices, and having a shoulder, D, to prevent the trace from working inward on the singletree, as suggested in Fig. 2, in which E represents an ordinary trace in cross-section. This frame is formed with lugs F, as seen in Fig. 5, and on a pivot-pin, G, which passes through these lugs, is mounted a gravitating pawl or dog, H, which occupies a slot in the frame and has a lip or projection, I, which engages the inner side of the frame near the end of the slot, as seen in Figs. 1 and 5, to limit the descent of the pawl or dog. A spring, J, is coiled about the pivot-pin G in such a manner as to cause its ends to normally spread apart, and one of these ends or prongs rests upon the upper side of the pawl and the other against the upper wall of the recess B. This spring prevents the dog or pawl from rattling, which would be objectionable on account of the noise and the incidental wearing of the parts.

It will be observed that the pivotal end of the dog is next to the end of the singletree, and that in slipping a trace over the singletree it would slide along the lower edge of the dog and lift it into the recess B until after the trace passed to the position seen in Fig. 2, when the dog gravitates and forms a shoulder which prevents the trace from slipping off. The spring will have an incidental function to more quickly depress the dog than if left to the influence of gravity. I do not confine myself to the use of the spring, however, as it may or may not be used, though it is preferred to use it for the purpose already stated. The action of the dog, however, is perfectly satisfactory in practice without the spring. In Figs. 2 and 4 I have illustrated the end of the singletree as cut off abruptly and the tapering portion substituted by a metallic shell or casing, K, which carries the pivot-pin G of the dog and also the shoulder D of the frame C. Indeed, this shell may be considered to be the frame C added to and fashioned to form the tapering end over which to slip the trace, and to constitute the recess B, into which the dog recedes in the manner before described. The spring J is also used in connection with this modified form. The dog by preference has a lip projecting from one side in this modified form, as seen in Fig. 4, but engages the frame or shell in the same manner as seen in Fig. 1.

It will be observed from Fig. 2 that the singletree extends far enough to bring the strains from the trace upon it and not against the projecting portion of the shell K, which would of course necessitate that the shell be very securely fastened to the singletree and would expose the device to weakness at this point. This defect is avoided by the arrangement shown in Fig. 2. Practically the same thing is true as regards Fig. 1, for the trace strains are more or less brought upon the part of the singletree not involved in the recess. By setting the lug D far enough to the left all of the strains of the traces may be brought upon the solid part of the singletree. In Fig. 6 I have illustrated the frame C as of a form adapted to fit into a mortise in the singletree and have shown the pawl or dog as resting at its pivot end in a recess, C', in the frame. Its action, however, is the same as in the other figures. In Fig. 7 I have fitted the pawl or dog to drop bodily instead of turning on a pivot. I have also applied a spring, J', which may or may not be used, as in the case of the spring J. As one means of preventing the dog from dropping entirely out of the recess, I have slotted it and put a transverse pin, B', through the slot. In all of the instances illustrated, however, the pawl or dog gravitates to oppose the trace and recedes into the recess when it is desired to put the trace on and take it off the singletree.

Among the advantages of my improved device may be mentioned these: that practically the full strength of the singletree is preserved, because the recess is outside of where the trace strains are exerted; that the pawl or dog, being on the under side of the singletree, is free from liability to become obstructed by snow or ice and is little exposed to mud, as the shaft and cross-bar of the shafts protect it, (when used in connection with shafts,) and that no projections extend above the singletree, so as to catch the horse's tail, while the device is cheap and easily applied, strong, and conveniently manipulated.

Having thus fully described my invention, what I claim as new, and desire to secure by Letters Patent, is—

1. The combination, with a single-tree having its under side near the end recessed, of a gravitating pawl mounted to recede into said recess as the trace is slipped over the recess and against the under edge of the pawl, whereby the pawl without hand manipulation recedes before the trace and allows the trace to slip into place.

2. The combination, with a singletree having a recess in the under side thereof near its end, of a gravitating pawl having its outer end pivoted within said recess, and a projection to limit its descent and arranged to recede into said recess without hand manipulation when the trace is slipped over the singletree and against the under edge of the pawl.

3. The combination, with a singletree having a shoulder projecting therefrom and a recess in the under edge and between said shoulder and its end, of a gravitating pawl within said recess, and having a pin or projection which limits its descent, the pawl being arranged to recede into the recess without hand manipulation by the act of putting on the trace.

4. The combination, with a singletree having a recess in its under side near its end and a shouldered frame secured thereto, with a slot opposite said recess, of a gravitating pawl having its outer end pivoted within said recess, and a projection from its inner end which engages said frame, the pawl being arranged to recede into the recess without hand manipulation by the act of putting on the trace.

5. The combination, with a singletree and a recess formed in the under side near the end thereof, of a gravitating pawl pivoted at one end within said recess and having a projection to limit its descent, and an anti-rattling spring which holds the pawl firmly in its gravitated position, the pawl being arranged to recede into the recess without hand manipulation by the act of putting on the trace.

6. The combination, with a singletree and a frame secured to the outer end thereof and constituting a recess, of a gravitating dog pivoted at its outer end within said recess and a projection to limit its descent, the pawl being arranged to recede into the recess without hand manipulation by the act of putting on the trace.

7. The combination, with a slotted frame adapted to be secured to a singletree and having a shoulder and lugs extending therefrom, of a gravitating pawl having its pivot-pin fitted to said lugs, and a projection at the other end which engages the frame, and an anti-rattling spring coiled about its pivot-pin, terminating in upper and lower branches or prongs, the pawl being arranged to recede into the recess without hand manipulation by the act of putting on the trace.

In testimony whereof I affix my signature in presence of two witnesses.

PHILIP S. WISEMAN.

Witnesses:
WILBER COLVIN,
WARREN HULL.